United States Patent Office 3,301,660
Patented Jan. 31, 1967

3,301,660
METAL PURIFICATION PROCESS
Toshiaki Imamura, Kumamoto-shi, Japan, assignor to Dojindo & Co. Ltd., Kumamoto-shi, Japan
No Drawing. Filed June 26, 1964, Ser. No. 378,455
Claims priority, application Japan, Oct. 22, 1963, 38/56,682
7 Claims. (Cl. 75—20)

The present invention relates to a process for the purification of metals which are in crude or impure state, and more particularly to the purification of metals by the so-called zone-melt procedure, wherein the crude or impure metals are reacted with a chelating agent and the metal chelates thus formed are subjected to zone-melting.

According to the zone-melt procedure, it is known to purify crude metals in order to obtain metals of high purity. In this procedure, however, it is necessary to subject the metals to high temperatures and carry out the purification in an inert atmosphere, to avoid undesirable oxidation of the metal. The known procedure is therefore difficult to carry out from a technical point of view.

It has now been discovered that many crystalline metal chelates melt without decomposition at temperatures as low as approximately 150 to 300° C. and that in this way, metal chelates of extreme purity can be produced when the chelates are subjected to purification by the zone-melt procedure, which comprises oxidizing the metal chelates in a stream of oxygen, and then reducing them with gaseous hydrogen. In this way, extremely pure metals can be produced, which are at least as pure as the metals obtained by the known zone-melt procedure.

In order to be used in the present invention, it is necessary to form metal chelates which not only melt without decomposition, but wherein the chelating agents meet the following requirements, namely:

(a) They must form metal chelates having relatively low melting points;
(b) The difference between the melting point and the boiling point must be relatively large; and
(c) The chelating agent must possess adequate thermal stability.

Examples of chelating agents which meet the above requirements, and which can be used in the present invention, are: acetylacetone, dipivaloylmethane, an acetacetic acid ester, malonaldehyde, thenoyltrifluoracetone, trifluoracetylacetone, hinokitiol, formylacetone and a metallocene, such as ferrocene. It is to be understood that the foregoing chelating agents are exemplary only, and that other chelating agents satisfying the above conditions can be equally well employed in the present invention. It is further to be noted that fluorine-containing chelating agents are especially desirable because of their low melting points and their satisfactory thermal stability.

In carrying out the present invention, the crude or impure metals are reacted with a suitable chelating agent, and the metal chelates thus formed are heated at temperatures in the range of approximately 150° to 300° C., and since the melting is carried out in a glass tube, the metal chelates do not become decomposed by oxidation. The present invention consequently has the important advantage that it requires only simple apparatus, as contrasted with the equipment necessary to carry out the zone-melting procedure in the standard or conventional manner. The present invention further makes it possible to provide metals of high purity in a novel, relatively simple, and highly effective manner for industrial purposes.

The invention is illustrated by the following non-limitative examples:

Example 1

From zinc ion and acetylacetone, the corresponding metal chelate compound bis(acetylacetonato)zinc (M.P. 124–130° C.) was prepared by a method per se known. The resulting chelate compound was melted into a hard glass tube of 10 mm. diameter and 30 cm. length, and the tube was sealed under an inert atmosphere. The contents of the tube occupies the lower 20 cm. of the tube. The uppermost contents of the tube contents is heated at approximately 135° C. by a circular electric heater made of nichrome wire and the heater is gradually transferred to the bottom of the tube at a speed of 4 cm./hr. heating the tube at the above-given temperature. When the heater reaches the bottom of the tube, it is promptly transferred to the top and then the abovementioned procedure is repeated a total of ten (10) times.

After the purification procedure as given above is completed, the uppermost portion (A) and a part (B) some 5 cm. from the top are taken, subjected to quantitative analysis by emission spectroscopic analysis, and the result is compared with the starting material.

[Unit: p.p.m.]

|  | Pb | Fe | Cd | Sn | Cu |
|---|---|---|---|---|---|
| A | 0.3 | 0.3 | 0.1 |  | 0.2 |
| B | 2.0 | 1.0 | 0.5 |  | 1.0 |
| Starting Material | 30 | 20 | 20 | 10 | 20 |

It is evident that the purity of the product has been greatly increased.

Example 2

From copper and dipivaloylmethane, the corresponding metal chelate compound bis(dipivaloylmethane) copper (M.P. 198° C.) was prepared by a method per se known. The resulting chelate compound was melted into a hard glass tube of 30 mm. diameter and 100 cm. length and the tube was sealed under an inert atmosphere. The tube contents occupies the lower 70 cm. of the tube. The uppermost portion of the tube is heated at about 205° C. by a circular electric heater and the heater is gradually transferred to the bottom at a speed of 5 cm./hr. heating the tube at the above-given temperature. When the heater reaches the bottom, it is rapidly transferred to the top and then the above-mentioned procedure is repeated for a total of thirty (30) times.

After the procedure is completed, the glass tube is broken, and the uppermost portion (A) and a part (B) some 30 cm. from the top are taken, subjected to analysis in the same manner as in the preceding example, and the result is compared with the starting material.

[Unit: p.p.m.]

|  | As | Sb | Bi | Pb | Fe |
|---|---|---|---|---|---|
| A |  |  |  |  |  |
| B | 10 | 20 | 2 | 3 | 1 |
| Starting Material | 30 | 100 | 50 | 50 | 100 |

Many other metals, in addition to those in the above examples, can be purified in accordance with the present invention, and as set forth in the table below, it being noted that it has been found to be generally desirable to heat the metal chelate to a temperature which is about 5° C. above its melting point, or at least slightly above the specified melting point.

TABLE

| Name of Metal | Name of Chelating Agent | M.p. of Metal Chelate, °C. |
|---|---|---|
| Ni | Acetylacetone | 228 |
| Al | ----do---- | 191-4 |
| Fe | ----do---- | 179-84 |
| Co | Dipivaloylmethane | 143 |
| Ni | ----do---- | 225 |
| Cu | ----do---- | 198 |
| Zn | ----do---- | 144 |
| Al | ----do---- | 264 |
| Fe | ----do---- | 163 |
| La | ----do---- | 148 |
| Ca | ----do---- | 224 |
| Ba | ----do---- | 172 |
| Fe | Ethyl acetocetate | 99-100 |
| Al | ----do---- | 76 |
| Cr | Malonaldehyde | 182-3 |
| Cu | Thenoyltrifluoroacetone | 242-3 |
| Cu | Trifluoroacetylacetone | 189 |
| Zn | Hinokitiol | 140 |
| Cu | ----do---- | 178 |
| Cr | Formylacetone | 168-9 |
| Fe | Ferrocene | 173-4 |

The foregoing is intended to be illustrative and not limitative, since within the terms of the appended claims, other metals and other chelating agents can be utilized, so long as the foregoing requirements are satisfied.

What is claimed is:

1. A metal purification process which comprises reacting a crude metal with a thermally stable chelating agent having a substantial difference between its melting point and boiling point to form the corresponding low melting point metal chelate, subjecting the chelate to zone-melting and subjecting the purified chelate to oxidation in a stream of oxygen and reduction with gaseous hydrogen to produce purified metal.

2. A metal purification process according to claim 1 in which the chelating agent is selected from the group consisting of acetylacetone, dipivaloylmethane, an acetocetic acid ester, malonaldehyde, thenoyltrifluoracetone, trifluoracetylacetone, hinokitiol, formylacetone and a metallocene.

3. A metal purification process according to claim 1 in which the metal is selected from the group consisting of nickel, aluminum, iron, cobalt, copper, zinc, lanthanum, calcium, barium and chromium.

4. A metal purification process according to claim 2 in which the metallocene is ferrocene.

5. A metal purification process which comprises reacting a crude metal with a chelating agent to form the corresponding metal chelate which melts without decomposition and then subjecting the thus formed metal chelate successively to zone-melting and then to oxidation with oxygen and reduction with hydrogen.

6. A process of purifying zinc which comprises reacting zinc with acetylacetone to form bis(acetylacetonato)zinc, subjecting the reaction product to zone melting at a temperature of approximately 135° C. and then successively subjecting the reaction product to oxygen and hydrogen to produce pure zinc.

7. A method of purifying copper which comprises reacting copper with dipivaloylmethane to form bis(dipivaloylmethane)copper, subjecting the reaction product to zone melting at a temperature of approximately 205° C. and then successively subjecting the reaction product to oxygen and hydrogen to produce pure copper.

References Cited by the Examiner

UNITED STATES PATENTS 2,739,088  3/1956  Pfann.
2,933,475  4/1960  Hoover et al. _____ 260—429

DAVID L. RECK, *Primary Examiner.*

H. W. TARRING, *Assistant Examiner.*